Patented Sept. 12, 1939

2,172,822

UNITED STATES PATENT OFFICE 2,172,822

ISOBUTENYL AMINES AND PROCESS OF MAKING THEM

Miroslav W. Tamele, Oakland, and Herbert P. A. Groll, Berkeley, Calif., assignors to Shell Development Company, San Francisco, Calif., a corporation of Delaware No Drawing. Application February 1, 1937, Serial No. 123,524

20 Claims. (Cl. 260—583)

This invention relates to a process for the production of useful unsaturated organic amines which comprises reacting an unsaturated organic halide of iso structure possessing an olefinic linkage between two carbon atoms of aliphatic character at least one of which is linked to a saturated monohalogenated carbon atom with ammonia, a primary amine, or a secondary amine.

The invention also relates to novel unsaturated organic amines possessing one or a plurality of isoalkenyl and/or substituted isoalkenyl radicals linked to the nitrogen atom, which novel unsaturated amines are adapted to a wide variety of commercial uses.

The unsaturated halides to which the principles of the invention are applicable are relatively much more reactive with respect to ammonia and the primary and secondary amines than the saturated halides, the unsaturated halides which are not of the allyl type, that is, which do not possess an unsaturated carbon atom linked to a saturated monohalogenated carbon atom, and the straight chain allyl type halides. The allyl type unsaturated halides of iso structure, to which this invention relates, can by virtue of their active structural arrangement be substantially completely reacted with ammonia, a primary amine, or a secondary amine at a practical rate under conditions of temperature, pressure and contact time of the reactants at which the occurrence of undesirable side reactions is substantially obviated.

Ammonia, the primary amines, and the secondary amines form a class of chemically related compounds which behave in a like manner as regards their reaction with unsaturated halides of the type herein described. The reaction which occurs in the execution of the invention comprises union of the unsaturated radical of the unsaturated halide with the nitrogen atom of the ammonia or amine. The resulting product comprises the ammonia or amine with one or more hydrogen atoms linked to the nitrogen atom replaced by the isoalkenyl radical of the unsaturated halide.

The general reactions involved may be illustrated by reference to the following equations representing the reaction of isobutenyl chloride with ammonia, a primary amine, and a secondary amine, respectively:

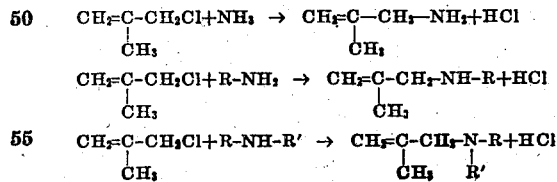

The unsaturated halides preferably employed in the execution of the invention may be represented by the formula R-Hal, wherein Hal represents a halogen atom, and R represents an isoalkenyl radical or substituted isoalkenyl radical linked to the halogen atom by a saturated carbon atom which is itself linked to an unsaturated carbon atom. One or more of the hydrogen atoms of the isoalkenyl radical may be substituted by suitable radicals such as cyclic radicals of the aromatic, alicyclic and heterocyclic series, the hydroxyl radical, halogen atoms, alkoxy radicals, aralkoxy radicals, aryloxy radicals, the amino group and the like, and in some cases the isoalkenyl radical may comprise part of an alicyclic structure. A suitable unsaturated halide may comprise one or a plurality of olefinic linkages and one or a plurality of halogen atoms; it is only essential that the compound possess at least one saturated monohalogenated carbon atom linked directly to an unsaturated carbon atom.

A preferred subgroup of unsaturated halides comprises those possessing in their structure at least one unsaturated tertiary carbon atom, that is, an unsaturated carbon atom which is linked to three carbon atoms. An unsaturated tertiary carbon atom is linked by a double bond to one carbon atom and by single bonds to two other carbon atoms. Of this preferred subgroup, we are particularly concerned with those members which possess the saturated tertiary carbon atom linked to or only once removed from the saturated monohalogenated carbon atom. Such unsaturated halides possess the characteristic structural grouping

wherein at least one of the $C^{III}$ carbon atoms is tertiary, that is, linked to three carbon atoms. The $C^{II}$ carbon atom is saturated and monohalogenated; however, other carbon atoms in the molecule may be linked to one or more halogen atoms. The loose bonds may be taken up by hydrogen atoms, halogen atoms, etc., and/or by the same or different alkyl, aralkyl, aryl, alkenyl, aralkenyl, carbocyclic, heterocyclic, and the like radicals, it being understood that at least on of the $C^{III}$ carbon atoms is tertiary, and that the $C^{II}$ carbon atoms is monohalogenated. The unsaturated halide may be mono-olefinic or polyolefinic. Particularly suitable poly-olefinic halides are those possessing a like number of olefinic linkages and monohalogenated carbon atoms, each olefinic linkage embracing a tertiary carbon atom linked to or once removed from a monohalogenated carbon atom.

The following are representative unsaturated halides which may be converted to valuable unsaturated amines in accordance with the process of the invention:

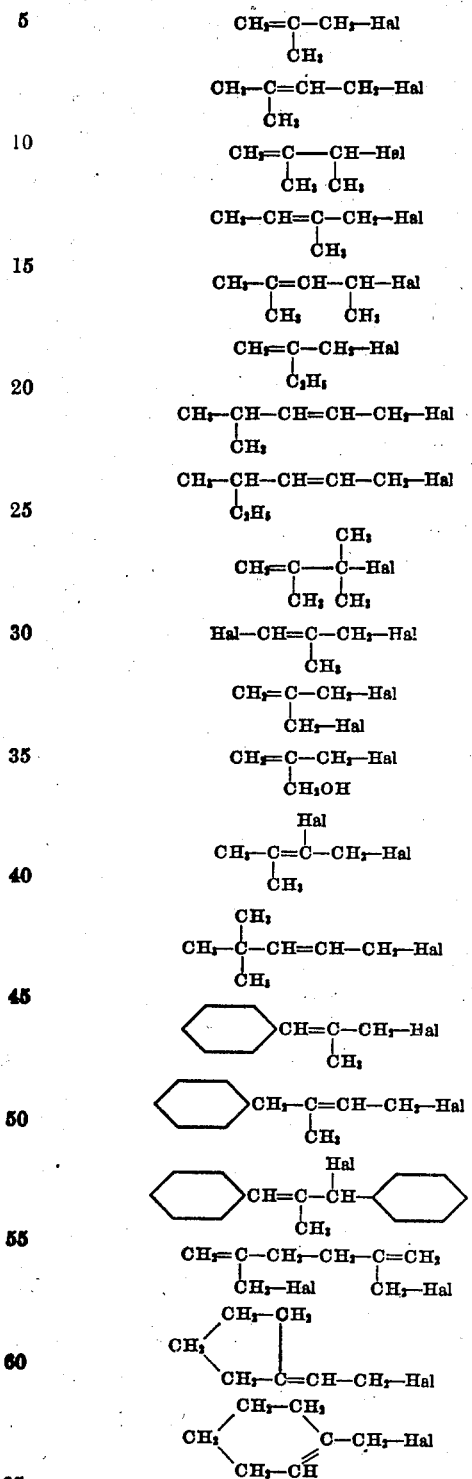

and the like and their homologues, analogues and suitable substitution products.

The unsaturated halides may be prepared by any suitable method and used severally or in admixture. Mixtures comprising a plurality of suitable branched chain allyl type halides may be treated and a mixture of the corresponding unsaturated amines obtained. If desired mixtures comprising one or a plurality of species of suitable branched chain allyl type halides and one or a plurality of species of less reactive halides may be treated under such conditions that the active allyl type halides are converted to the desired unsaturated amine or amines while leaving the less reactive halides substantially unaffected. Thus, for example, a crude mixture of isobutenyl chloride and isocrotyl chloride may be treated and the isobutenyl chloride-content thereof converted is isobutenyl amines which are readily separated from the unreacted iso-crotyl chloride. This mode of operation dispenses with the difficult step of preliminarily separating the allyl type and vinyl type halides. If an unsaturated halide, such as 2-methyl-1,3-dichlor-propene-1, which is of the vinyl type as well as of the active allyl type, is treated in accordance with the process of the invention, the halogen atom linked to the saturated carbon atom will enter into the reaction while the halogen atom linked to the unsaturated carbon atom will ordinarily not be affected and the product will be an unsaturated chlorinated amine.

Because they are cheaper and more readily available, the unsaturated chlorides of the type herein described are preferably employed. Suitable unsaturated chlorides may be prepared by effecting the chlorination of olefines. Isobutylene may be chlorinated to isobutylene chloride easily and economically. Tertiary amylene may be chlorinated to obtain a mixture of suitable isopentenyl chlorides, which mixture may be treated per se, or the different species of isopentenyl chlorides may be separated therefrom and treated independently.

The ammonia, primary amines, and secondary amines with which the unsaturated halide or halides is/are reacted may be represented by the general formula R—NH—R′, wherein R and R′ may be the same or different and represent hydrogen atoms or hydrocarbon radicals which may or may not be further substituted by suitable inorganic or organic substituents. When R and R′ both represent hydrogen atoms, the reactant is ammonia. When one of the radicals represented by R or R′ is a hydrocarbon radical or substituted hydrocarbon radical and the other is a hydrogen atom, the reactant is a primary amine. When both R and R′ represent hydrocarbon radicals or substituted hydrocarbon radicals, the reactant is a secondary amine. Suitable hydrocarbon radicals which R and R′ may represent are radicals such as alkyl, aryl, aralkly, alkenyl, aralkenyl, alicyclic, and the like. One or more hydrogen atoms of a suitable hydrocarbon radical may be substituted by inorganic or organic substituents such as halogen atoms, sulphur atoms, alkoxy radicals, aralkoxy radicals, hydroxy groups, amino radlicals, etc.

A suitable primary amine may be saturated or unsaturated, of aliphatic aralkyl or alicyclic character, and possess one or a plurality of amino radicals. The following are representative primary amines; methylamine, ethylamine, isopropylamine, the butylamines, the amylamines, the hexyl amines, ethylenediamine, propylenediamine, the butylenediamines, benzylamine, phenethylamine, xylylamine, aniline, toluidine, xylidine, mesidine, phenylenediamine, allylamine, crotylamine, isobutenylamine, the isopentenylamines, geranylamine, vinylamine and the like and their homologues, analogues and suitable substitution products. Suitable substituted amines are the halogenated alkenylamines such as chlor-1, 3-amino-propene-1, the alkyl-olamines such as ethanolamine, the propanolamines, the butanolamines and the like and their homologues and analogues.

The secondary amines suitable for use in the execution of the invention may comprise aliphatic, araylkyl or alicyclic radicals, be saturated or unsaturated, and be of simple or mixed character. The following are representative secondary amines: dimethylamine, diethylamine, the dipropylamines, the dibutylamines, methyl-ethylamine, ethyl-propylamine, propyl-butylamine, methyl-benzylamine, methyl-phenethylamine, methyl-aniline, ethyl-aniline, diallylamine, methyl-allylamine, dicrotylamine, methyl-crotylamine, allyl-crotylamine, methyl-isobutenylamine, allyl-isobutenylamine, phenyl-allylamine, phenyl-isobutenylamine, diisobutenylamine, diisopentenylamine and the like and their homologues, analogues and substitution products. The following are examples of substituted diamines: methyl-(chloro-1-propene-1) amine, diethanolamine, dipropanolamine, diisopropanolamine, the dibutanolamines, and the like.

The invention may be executed in any suitable type of apparatus. For example, the unsaturated halide, the ammonia or amine, and, if desired, a suitable solvent for either or both of the reactants may be charged in any suitable manner to a reaction vessel of appropriate size, such as an autoclave, which is preferably equipped with suitable heating and cooling means and means for agitating its contents as by mechanical stirring. Ammonia and the amines which are sufficiently soluble may be charged to the reaction vessel as an aqueous solution of the desired concentration. If the selected amine is not sufficiently soluble in water, it may be directly added to the reactor as a gas, liquid or solid or added as a suspension in water and/or the unsaturated halide or the unsaturated halide-containing mixture treated, or dissolved or suspended in some other solvent which is preferably a liquid organic solvent substantially inert under conditions at which the process is executed. Suitable solvents for this purpose are the hydrocarbons and hydrocarbon mixtures particularly those which are liquid at ordinary temperatures as gasoline, benzene, hexane, octane, diisobutylene and the like. The alcohols, particularly the aliphatic monohydric alcohols such as ethanol, propanol, isopropanol, butanol, secondary butanol, tertiary butanol and the like, are conveniently applied extraneous solvents or diluents. In many cases, particularly when ammonia is the reactant employed, the reaction is more advantageously effected in the presence of an alcohol than in the presence of water for the following reasons: there is less corrosion of the metal reaction apparatus—the alcohol inhibits corrosion of the steel or iron reaction vessel and conduits caused by the action of the ammonium halides such as $NH_4Cl$; and, the reaction products may in some cases be recovered from the reaction mixture with greater ease—the alcohol can be selected with respect to the unsaturated halide and the resulting unsaturated amines so that the former has a boiling temperature which will permit it to be readily separated from the latter. After each run, the alcohol or other solvent employed may be recovered and reutilized. Other types of corrosion-inhibiting means may be employed. For example, the reaction may be executed in the presence of added basic-acting agents including the metal oxides, hydroxide, etc., particularly the alkali metal—and alkaline earth metal carbonates and bicarbonates, which extraneous agents also aid in maintaining the reaction mixture basic throughout the operation.

The invention is preferably executed at a temperature of from about 80° C. to about 250° C., although higher or lower temperatures may be employed when desired. Temperatures below about 80° C. are in some cases undesirable due to the low rate of reaction. Temperatures greater than about 250° C. may be undesirable in that losses due to destruction of the unsaturated halide and unsaturated amines may be prohibitive to the economical execution of the invention. The optimum temperature is dependent upon the nature of the reactants employed, their concentration in the reaction mixture, their residence time in the reactor, the pressure employed, etc.

The invention may be executed in the gaseous or liquid phase at any convenient pressure. We prefer to execute the reaction in the liquid phase under a superatmospheric pressure. The normally gaseous reactants as ammonia, methylamine, etc. may be liquefied and reacted in the liquid state by maintaining a sufficiently high pressure in the system. The reaction may be effected under elevated pressures by maintaining in the reactor a superatmospheric pressure at least equal to the combined vapor pressures of the constituents of the reaction mixture at the operating temperature. It is in many cases preferable that the reaction be effected under such conditions as to permit the existence of substantially only a liquid phase in the reaction system. When operation in this manner is desired, the reactants may be forced into the reaction system by means of hydrostatic pressure until any gas phase therein collapses and the contents are in substantially only the liquid phase. Any additional pressure can be applied by hydrostatic means as desired. The use of superatmospheric pressures permits us to increase materially the velocity of the reaction since reaction temperatures greater than the atmospheric boiling temperature of the reaction mixture may be used. In general, expensive high-pressure equipment is unnecessary, since advantageous results may be obtained under moderately elevated pressures.

The unsaturated halide may be reacted with an equivalent molecular quantity of ammonia or the amine, or either of the reactants may be in excess. In general we prefer to effect the reaction under alkaline condition, that is, in the presence of a sufficient quantity of one or more basic-acting agents to substantially neutralize the hydrogen halide liberated in the course of the reaction thus permitting reaction under substantially basic conditions and avoiding decomposition of the unsaturated amines and excessive corrosion due to the presence of free hydrogen halide. The reaction may be effected under substantially basic conditions by employing a sufficient excess of the ammonia or amine to neutralize the liberated hydrogen halide, or, in addition to the ammonia or amine, which may or may not be in excess of that required for the reaction desired, we may employ an extraneous basic-acting agent in the desired amount. Suitable agents for this purpose are, among others, the metal hydroxides, the metal carbonates, the metal bicarbonates, the basic metal oxides, the basic metal salts, etc., particularly the alkali metal—and alkaline earth metal oxides, hydroxides, carbonates and bicarbonates. The use of an extraneous basic compound is particularly desirable when, for example, ammonia or a suitable amine is reacted with a suitable unsaturated halide to form the corresponding di- or triamine, because in such a case it may be desirable to have the unsaturated halide rather than ammonia or the amine in excess in the reaction mixture. The relative proportions of the reactants in the reaction mixture will, among other factors, determine the ratio of the products obtained. For example, when a suitable unsaturated halide is reacted with ammonia, a mixture comprising the corresponding unsaturated primary, secondary and tertiary amines is generally obtained. By a suitable control of the molecular proportion of the reactants, the conditions of reaction and the residence time in the reactor, the desired product or products may be made to substantially predominate. A substantial molecular excess of ammonia over the unsaturated halide, and relatively short contact times in general favor primary amine formation. These considerations do not apply when the reactant is a secondary amine; the secondary amine contains only one replaceable hydrogen atom linked to the nitrogen atom of the amine.

The invention is preferably executed while agitating the reaction mixture by any suitable means as by flow through reactor tubes containing baffles, by mechanical stirring, etc. Agitation of the reaction mixture is advantageous for many reasons. It insures better contact of the reactants and accelerates the reaction rate; it insures reaction in the liquid phase and thus facilitates completion of the desired reaction while avoiding undesirable side reactions as polymerization, etc. When the reaction mixture is agitated, the hydrogen halide liberated in the course of the reaction is neutralized by the excess of ammonia, amine or added basic agent before any substantial amount of it can accumulate in the system. Thus, agitation aids in protecting metal reactors against excessive corrosion which would occur if hydrogen halides, in high concentrations, were permitted to accumulate therein. In general, the rate of agitation is regulated with respect to the temperature. At the higher temperatures, it is desirable to agitate more vigorously.

The invention may be executed in a batch intermittent or continuous manner. If it is desired to dispense with the use of autoclaves equipped with mechanical stirring means, the invention may be executed advantageously, in a continuous manner if desired, by utilizing a tubular reactor. The tubular reactor may comprise reaction tubes of the requisite size connected in series through which the mixture comprising the reactants is caused to flow under the desired conditions of temperature, pressure and residence time. Throughout the length of the tubes, orifice plates or baffles may be provided at such intervals as to keep the reaction mixture in violent turbulence.

The unsaturated amine or amines may be recovered from the reaction mixture in any suitable manner, the specific mode of recovery being adapted to the nature of the product or products. Suitable modes of recovery include extraction and/or distillation under reduced or ordinary pressure.

The following specific examples illustrate suitable modes of executing the invention. It is to be understood that the examples are for illustrative purposes only and that the invention is not to be regarded as limited to the specific reactants, conditions, or modes of operation therein described.

*Example I*

About 4 mols of isobutenyl chloride, 7 mols of ammonia and 17 mols of water (490 c. c of a 28% aqueous solution of ammonia) were charged to a suitable reaction vessel equipped with heating and cooling means and means for mechanically stirring its contents. The vessel was closed and its contents heated to a temperature of about 64° C., at which temperature the pressure in the reaction vessel was about 107 lbs./sq. in. (gauge). When the stirring was started, the reaction proceeded rapidly at this temperature as indicated by the rapid drop in pressure. The stirring was continued while the temperature was raised to about 115° C. and maintained at this temperature for about 9 minutes. At the end of this time, the pressure in the reaction vessel, which pressure had reached a maximum of about 123 lbs./sq. in., dropped to a constant value of about 45 lbs./sq. in., indicating substantial completion of the reaction.

The cooled reaction mixture discharged from the reaction vessel stratified into two liquid phases which were separated. The upper layer consisted, for the most part, of unsaturated amines. The lower or aqueous layer contained amine salts, unreacted ammonia, ammonium chloride and some unsaturated amines. The unsaturated amines were recovered from both layers by distillation.

About 1.414 mols of isobutenylamine, about 0.798 mol of diisobutenylamine, and about 0.035 mol of triisobutenylamine were recovered. A small amount of the quaternary ammonium salt was formed. Calculated on the isobutenyl chloride consumed the yield of the various unsaturated amines was:

| | Per cent |
|---|---|
| Diisobutenylamine | 41.0 |
| Isobutenylamine | 36.3 |
| Triisobutenylamine | 2.6 |

These products are readily separated by distillation. The products are novel and useful compounds. Isobutenylamine boils at a temperature of from about 77.8° C. to about 78.1° C. at atmospheric pressure. Diisobutenylamine has an atmospheric boiling temperature of about 148.8° C. to 149° C. It forms an azeotrope with water boiling at about 94° C. Triisobutenylamine has an atmospheric boiling temperature of about 194° C. to 195° C. Under a pressure of about 10 mm. of Hg, it boils at about 72° C.

*Example II*

About 2 mols of isobutenyl chloride and about 500 c. c. of secondary butyl alcohol were charged to a pressure reaction vessel of the type described in Example I. This mixture was stirred at room temperature while gaseous ammonia was introduced into the reaction vessel in an amount sufficient to build up a pressure of about 60 lbs./sq. in. (gauge). A total of about 6 mols of ammonia was introduced. Sufficient heat was then applied to maintain the pressure at about 130 lbs./sq. in (gauge) over a period of about 1 hour. At the end of this time, the temperature of the reaction mixture was about 80° C.

The cooled mixture discharged from the reaction vessel was filtered to separate solids therefrom. The filtrate was distilled to recover the unsaturated amines. The main reaction product was diisobutenylamine; only small amounts isobutenylamine and triisobutenylamine were recovered. The diisobutenylamine was obtained in good yield. Due to the fact that the reaction was effected in alcohol, there was substantially no corrosion of the metal reaction vessel.

Example III

Aniline (about 4 mols), sodium bicarbonate (about 1.5 mols) and about 100 c. c. of water were charged to a reaction vessel equipped with mechanical stirring means and a reflux condenser. The mixture was stirred and heated at a temperature of about 94° C. while isobutenyl chloride (about 1 mol) was added slowly over a period of about 3.5 hours.

At the end of this time, the mixture was cooled and filtered to separate solid material. The upper layer of the stratified filtrate was separated, washed with a saturated salt solution, dried with sodium sulphate, and distilled under reduced pressure. The distillation yielded about 111 grams of isobutenylphenylamine which boiled at a temperature of about 105° C. to 106° C. under a pressure of about 10 mm. of Hg. The yield of the novel unsaturated amine was about 84%.

Example IV

About 125 gm. of ethylenediamine (2.05 mols), 50 gm. of sodium carbonate (0.49 mol) and about 25 c. c. of water were charged to a reaction vessel of the type described in Example III. The mixture was stirred and kept at a temperature of about 90° C. while isobutenyl chloride was added slowly. After about 2 hours, the mixture was cooled and about 0.59 mol of sodium carbonate and about 25 c. c. of water were added. The stirring and addition of isobutenyl chloride were continued at about the same temperature for an additional hour. At the end of this time, a total of about 1.1 mols of isobutenyl chloride had been added.

About 350 c. c. of water were added to the cooled mixture to dissolve the solid salts. The aqueous solution was extracted with ethyl ether. The ether extract was dried and distilled under reduced pressure. The main reaction product was N,N'-diisobutenyl-ethylene diamine. This novel compound, which was obtained in good yield, boiled in the range of from 91.8° C. to 94.8° C. under a pressure of about 10 mm. of Hg.

Example V

About 0.685 mol of crotylamine, 0.715 mol of sodium bicarbonate, and about 100 c. c. of water were charged to a reaction vessel equipped with a reflux condenser and mechanical stirring means. The mixture was stirred and heated at a temperature of about 90° C. while about 0.685 mol of isobutenyl chloride were added slowly over a period of about 2.25 hours. After all of the isobutenyl chloride had been added, the mixture was refluxed for about 1.25 hours. At the end of this time, the cooled reaction mixture was filtered. The filtrate was treated with sodium hydroxide to salt out the amines. The upper layer was separated, dried and distilled.

Two reaction products, isobutenyl-crotylamine and diisobutenyl-crotylamine, were obtained. Most of the product was diisobutenyl-crotylamine, which product was obtained in good yield. The unsaturated secondary amine has an atmospheric boiling temperature of about 154° C. to 155.5° C. The tertiary amine boils at 197° C. to 198° C. under atmospheric pressure.

Example VI

About 0.534 mol of diisobutenylamine, 0.55 mol of sodium bicarbonate and about 50 c. c. of water were charged to a reaction vessel equipped with a reflux condenser and mechanical stirring means. The mixture was stirred and heated at about 92° C. while about 0.48 mol of isobutenyl chloride were added slowly over a period of about 2.5 hours. At the end of this time, the reaction mixture was diluted with about 100 c. c. of water and allowed to stratify. The upper layer was separated, washed with a sodium carbonate solution, dried and distilled under reduced pressure.

The product, triisobutenylamine, was obtained in good yield. It boiled at 72° C. under a pressure of about 10 mm. of Hg.

Example VII

Isobutenyl chloride and an equimolecular quantity of diisobutenylamine were sealed in a glass tube and the tube heated at a temperature of about 100° C. for about 2 hours. The cooled tube was opened and the contents filtered by suction. The solid in the filter was in the form of plates which were colorless when free of liquid. The solid material was treated with a sodium hydroxide solution. The upper layer of this solution was added to the initial filtrate. The resulting mixture was dried with anhydrous $K_2CO_3$ and distilled. The product, triisobutenylamine, was obtained in good yield.

The unsaturated amines prepared in accordance with the process of the invention are adapted to a wide variety of uses. They are useful raw materials in the production of a wide variety of valuable chemicals such as dye-stuffs, medicinal preparations, soaps, resins, etc. They are valuable solvents and components of solvent mixtures. For example, many of them may be used per se or in admixture with other agents as solvents for unsaturated compounds as acetylene, the mono-olefines, the diolefines, etc., and the acidic gases as $CO_2$, $H_2S$, HCN, etc. They may be used as components of anti-freeze mixtures for use in the radiators of internal combustion engines. Many of the unsaturated amines are useful as anti-oxidants for stabilizing hydrocarbon oils, ethers, aldehydes, etc., and as stabilizers in the production of sulphones. In other cases, as in the production of plastics, the unsaturated amines may act as accelerators.

The unsaturated organic amines containing in their molecules at least one alkenyl chain possessing an olefinic linkage between two aliphatic carbon atoms one of which is tertiary and linked to a saturated carbon atom which in turn is linked to the nitrogen atom of the amine are novel and useful compounds.

While we have described our invention in a detailed manner and provided specific examples illustrating suitable modes of executing the same, it is to be understood that modifications may be made and that no limitations upon the invention other than those imposed by the scope of the appended claims are intended.

This application is a continuation-in-part of our application, Serial No. 636,176, filed October 4, 1932, which issued as U. S. Patent 2,072,015 on February 23, 1937.

We claim as our invention:

1. A process for the production of valuable unsaturated organic amines which comprises reacting an unsaturated halide possessing an alkyl chain containing an olefinic linkage between two aliphatic carbon atoms at least one of which is tertiary and one of which is directly linked to a saturated monohalogenated carbon atom with a reactant of the class consisting of ammonia, primary amines and secondary amines, at a temperature of from 80° C. to 250° C. and at a superatmospheric pressure at least equal to the combined vapor pressures of the constituents of the reaction mixture at the operating temperature.

2. A process for the production of valuable unsaturated organic amines which comprises reacting an unsaturated halide possessing an alkyl chain containing an olefinic linkage between two aliphatic carbon atoms one of which is tertiary and directly linked to a saturated monohalogenated carbon atom with a reactant of the class consisting of ammonia, primary amines and secondary amines under alkaline conditions at a temprature of from about 80° C. to about 250° C. and under a superatmospheric pressure at least equal to the combined vapor pressures of the constituents of the reaction mixture at the operating temperature.

3. A process for the production of valuable unsaturated organic amines which comprises reacting an unsaturated halide possessing an alkyl chain containing an olefinic linkage between two aliphatic carbon atoms one of which is tertiary and directly linked to a monohalogenated carbon atom with a reactant of the class consisting of ammonia, primary amines and secondary amines under alkaline conditions in the presence of a basic-reacting metal compound, the reaction being effected in the liquid phase at a temperature of from about 80° C. to about 250° C. and under a superatmospheric pressure at least equal to the combined vapor pressures of the constituents of the reaction mixture at the operating temperature while agitating the reaction mixture to avoid local acidity.

4. A process for the production of valuable unsaturated organic amines which comprises reacting an unsaturated halide possessing an alkyl chain containing an olefinic linkage between two aliphatic carbon atoms one of which is tertiary and directly linked to a monohalogenated carbon atom with more than an equivalent quantity of a reactant of the class consisting of ammonia, primary amines and secondary amines in the presence of water at a temperature of from about 80° C. to about 250° C. and under a superatmospheric pressure at least equal to the combined vapor pressures of the constituents of the reaction mixture at the operating temperature.

5. A process for the production of isobutenyl amines which comprises reacting isobutenyl chloride with a reactant of the class consisting of ammonia, primary amines and secondary amines, at a temperature of from 80° C. to 250° C. and at a superatmospheric pressure at least equal to the combined vapor pressures of the constituents of the reaction mixture at the operating temperature.

6. A process for the production of valuable unsaturated organic amines which comprises reacting an unsaturated halide possessing a branched alkyl chain containing an olefinic linkage between two aliphatic carbon atoms one of which is tertiary and directly linked to a saturated monohalogenated carbon atom with ammonia, at a temperature of from 80° C. to 250° C. and at a superatmospheric pressure at least equal to the combined vapor pressures of the constituents of the reaction mixture at the operating temperature.

7. A process for the production of valuable unsaturated organic amines which comprises reacting an unsaturated halide possessing a branched alkyl chain containing an olefinic linkage between two aliphatic carbon atoms one of which is directly linked to a saturated monohalogenated carbon atom with ammonia under alkaline conditions at a temperature of from about 80° C. to about 250° C. and under a superatmospheric pressure at least equal to the combined vapor pressures of the constituents of the reaction mixture at the operating temperature.

8. A process for the production of valuable unsaturated organic amines which comprises reacting an unsaturated halide possessing an alkyl chain containing an olefinic linkage between two aliphatic carbon atoms one of which is tertiary and directly linked to a saturated monohalogenated carbon atom with more than an equivalent quantity of an aqueous solution of ammonia at a temperature of from about 80° C. to about 250° C. and under a superatmospheric pressure at least equal to the combined vapor pressures of the constituents of the reaction mixture at the operating temperature.

9. A process for the production of valuable unsaturated organic amines which comprises reacting an unsaturated halide possessing an alkyl chain containing an olefinic linkage between two aliphatic carbon atoms one of which is tertiary and directly linked to a saturated monohalogenated carbon atom with ammonia under alkaline conditions in the presence of a liquid organic solvent which is substantially inert under the conditions of operation, the reaction being effected at a temperature of from about 80° C. to about 250° C. and under a superatmospheric pressure at least equal to the combined vapor pressure of the constituents of the reaction mixture at the operating temperature.

10. A process for the production of valuable unsaturated organic amines which comprises reacting an unsaturated halide possessing an alkyl chain containing an olefinic linkage between two aliphatic carbon atoms one of which is tertiary and directly linked to a saturated monohalogenated carbon atom with ammonia in the presence of an aliphatic alcohol, the reaction being effected at a temperature of from about 80° C. to about 250° C. and under a superatmospheric pressure at least equal to the combined vapor pressures of the constituents of the reaction mixture at the operating temperature.

11. A process for the production of isobutenyl amines which comprises reacting isobutenyl chloride with ammonia under substantially alkaline conditions in the presence of water and a basic-acting metal compound at a temperature of from about 80° C. to about 250° C. and under a superatmospheric pressure at least equal to the combined vapor pressures of the constituents of the reaction mixture at the operating temperature.

12. A process for the production of isobutenyl amines which comprises reacting isobutenyl chloride with more than an equivalent quantity of ammonia in the presence of secondary butyl alcohol at a temperature of from about 80° C. to about 250° C. and under a superatmospheric pressure at least equal to the combined vapor pressures of the constituents of the reaction mixture at the operating temperature.

13. An isobutenyl amine.
14. The compound: monoisobutenylamine.
15. The compound: diisobutenylamine.
16. The compound: triisobutenylamine.
17. An unsaturated organic amine of the general formula

wherein R represents an organic radical containing an olefinic linkage between two aliphatic carbon atoms one of which is tertiary and directly linked to a saturated primary carbon atom which in turn is directly linked to the nitrogen atom, and $R_1$ and $R_2$ represent substituents of the group consisting of the hydrogen atom and organic radicals containing an olefinic linkage between two aliphatic carbon atoms one of which is tertiary and directly linked to a saturated carbon primary atom which in turn is directly linked to the nitrogen atom.

18. An unsaturated organic amine of the general formula $R-NH_2$ wherein R represents an organic radical containing an olefinic linkage between two aliphatic carbon atoms one of which is tertiary and directly linked to a saturated primary carbon atom which in turn is directly linked to the nitrogen atom.

19. An unsaturated organic amine of the general formula $R-NH-R_1$ wherein R and $R_1$ represent organic radicals containing an olefinic linkage between two aliphatic carbon atoms one of which is tertiary and directly linked to a saturated primary carbon atom which in turn is directly linked to the nitrogen atom.

20. An unsaturated organic amine of the general formula

wherein R, $R_1$ and $R_2$ represent organic radicals containing an olefinic linkage between two aliphatic carbon atoms one of which is tertiary and directly linked to a saturated primary carbon atom which in turn is directly linked to the nitrogen atom.

MIROSLAV W. TAMELE.
HERBERT P. A. GROLL.